No. 741,877. PATENTED OCT. 20, 1903.
D. BEST.
WHEEL.
APPLICATION FILED MAR. 19, 1903.
NO MODEL.
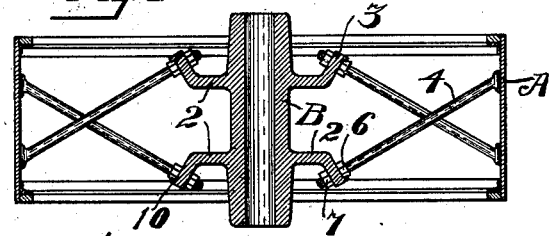
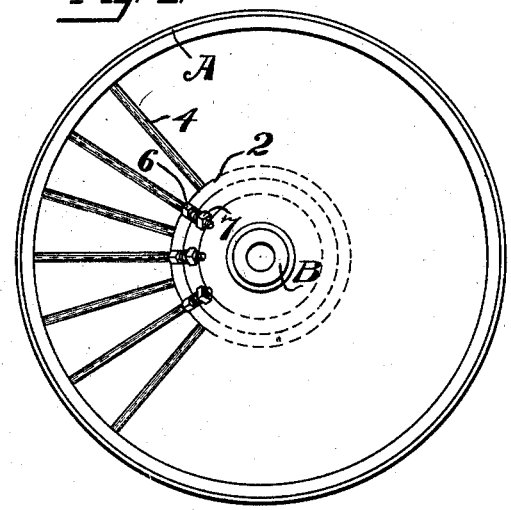
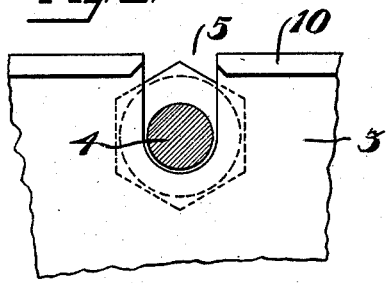
Witnesses,
Inventor,
Daniel Best
By Geo. H. Strong
atty
Dudley Moss.

No. 741,877. Patented October 20, 1903.

UNITED STATES PATENT OFFICE.

DANIEL BEST, OF SAN LEANDRO, CALIFORNIA.

WHEEL.

SPECIFICATION forming part of Letters Patent No. 741,877, dated October 20, 1903.

Application filed March 19, 1903. Serial No. 148,594. (No model.)

*To all whom it may concern:*

Be it known that I, DANIEL BEST, a citizen of the United States, residing at San Leandro, county of Alameda, State of California, have invented an Improvement in Wheels; and I hereby declare the following to be a full, clear, and exact description of the same.

My invention relates to the class of vehicle-wheels, and especially to those wheels which are to be used with heavy vehicles, such as harvesters, traction-engines, road-locomotives, and the like.

My invention consists in a novel construction of the hub and attachment of the spokes thereto, as hereinafter fully described.

Referring to the accompanying drawings, Figure 1 is a vertical section of the wheel in the plane of the axis. Fig. 2 is a side view, and Fig. 3 is an enlarged view, of one of the hub-flanges.

As shown in my Patent No. 433,193, the wheel consists of an exterior rim and a hub, this hub having two flanges which are inclined outwardly at their peripheries, so as to form annular surfaces at right angles with the line of the spokes, the spokes extending from these hub-flanges outwardly to the rim, crossing each other between the hub and the rim and having their outer ends secured in the rim. The hub-flanges are slotted from the edges inwardly, so that when the spokes have been properly fixed in the rims the inner ends may be slipped into these slots after the locking-nuts have been placed upon the inner threaded ends, and by screwing the nuts upon the inner ends and against the hub-flanges the proper tension is brought upon the spokes and the hub is centered within the rim, making a strong and durable wheel.

In my former patent a guard-ring or equivalent securing device was fixed upon the outer edges of each of the hub-flanges to prevent the spokes from being accidentally slipped out of the slots.

It is the object of my present invention to so construct the wheel-hub as to enable the spokes to be readily inserted and removed without bending and to insure them against accidental displacement or removal from the slots or channels.

As shown in the drawings, A is the rim of the wheel. B is the hub, having flanges 2, the outer peripheries of which are beveled or inclined outwardly, as shown at 3. These inclined surfaces are at right angles with the line of the spokes 4, which are headed or suitably fixed in the wheel-rim and, crossing each other, are adapted to lie in slots 5, which are formed in the peripheries of the hub-flanges. The inner ends of these spokes are screw-threaded, and nuts 6 and 7 are fitted upon them. The wheel is then built up by first placing the hub approximately central within the rim and introducing the spokes through the rim and laying the inner ends in the slots into the hub-flanges after having first placed the nuts 6 upon the screw-threaded inner ends of the spokes. The parts may first be loosely put together, and afterward by tightening the inner ends the hub is properly centered with relation to the rim with sufficient tension upon the spokes to make the wheel absolutely rigid. The inner or lock nuts 6 may then be screwed down against the outer faces of the beveled flanges to complete the wheel.

In order to insure the spokes remaining in proper position without the necessity of an exterior guard-ring or equivalent holder, I have shown on the outer peripheries of the beveled hub flanges turned up to form rings, as at 10. These ribs may either be formed upon the inner or outer edges of the flanges, or both; but I have found it sufficient to fit them upon one side of the flanges. The nuts being then screwed down to the proper position will lie against these upturned ribs, and the spokes cannot be removed until the nuts have been turned back sufficiently to clear the ribs. It will be understood that these ribs may be continuous or may be in short sections adjacent to each of the grooves.

I have shown the edges of the ribs 10 which are contiguous to the slots as beveled or inclined on the inner angles, so that the nuts when drawn down will fit these beveled angles and more surely lock the nuts in place.

Having thus described my invention, what I claim, and desire to secure by Letters Patent, is—

1. In a wheel the hub having flanges whose outer surfaces are beveled and formed with grooves which open inwardly from said surfaces, spokes fitting said grooves, nuts by which the spokes are locked in place and ribs formed contiguous to the outer edges of the hub-flanges and adapted to engage the nuts.

2. The combination in a wheel of a rim, a hub having flanges with beveled outer faces and slots formed radially therein, spokes extending from the rim having their inner ends screw-threaded and adapted to lie within the grooves, nuts by which the spokes are locked to the hub and shoulders formed upon the hub-flanges exterior to the nuts.

In witness whereof I have hereunto set my hand.

DANIEL BEST.

Witnesses:
J. N. FRANK,
D. MCCARTHY.